March 28, 1967 R. A. WATERS 3,311,825
MULTI-BAND DIRECT READING GRID DIP METER
Filed Aug. 7, 1963
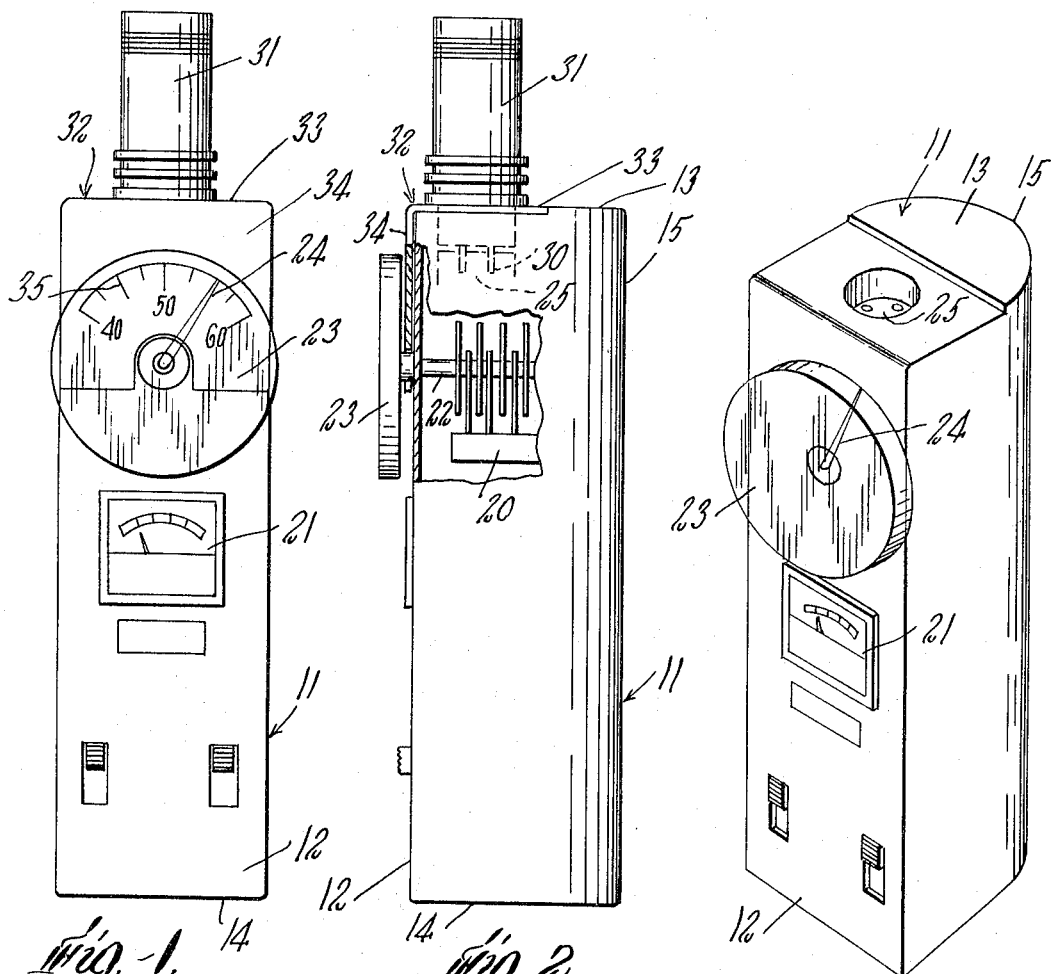
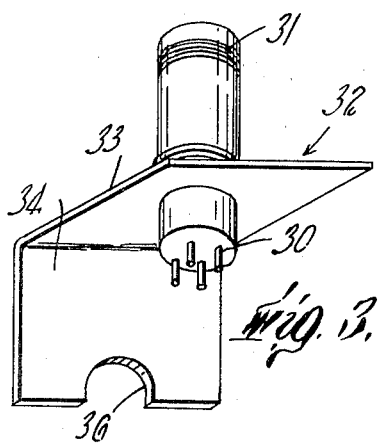
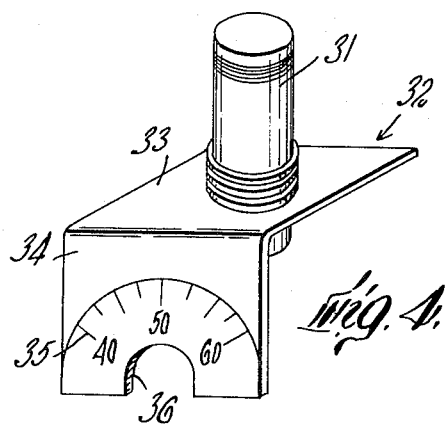

United States Patent Office 3,311,825
Patented Mar. 28, 1967

3,311,825
MULTI-BAND DIRECT READING GRID DIP METER
Robert A. Waters, Weston, Mass., assignor to Waters Manufacturing, Inc., Wayland, Mass., a corporation of Massachusetts
Filed Aug. 7, 1963, Ser. No. 300,546
2 Claims. (Cl. 324—115)

This invention relates to electronic instruments for measuring and generating radio frequency signals, such as grid dip meters, and in particular, to the induction elements and frequency reading scales in such instruments.

A major shortcoming in such an instrument stems from the fact that the range of frequencies on which it can operate with a single frequency determining element depends upon the size of that element and is necessarily rather narrow if the instrument is to produce an acceptable degree of frequency accuracy. In order to provide an instrument useful over a wide frequency range, it is thus necessary to utilize a large number of mutually supplementary sub-ranges, for example by using a plurality of interchangeable induction coils. A by-product of such a system is the requirement of a different frequency scale for each coil.

Normally, in the prior art, a multiple scale has been used, with several resultant disadvantages. For example the crowding together of a number of scales causes reading errors, and even when the correct scale is selected by the eye, much effort is required to continue to focus upon it as other steps in the operation are carried out. The crowding factor also works to minimize the number of sub-ranges that can be used, and hence minimizes the total effective range of the instrument. These latter difficulties raise particular problems in miniaturized instruments, such as hand-held grid dip meters with which this invention is particularly concerned.

Accordingly, the object of the present invention is to provide an instrument of the type described, useful over a wide range of frequencies, with a high degree of accuracy, which eliminates the need for multiple scales.

This object is achieved by providing a plurality of inductance elements having frequency reading scales so that the single step of inserting an inductance element will automatically cause the scale to change to one having a range appropriate to the inductance so electrically incorporated into the instrument.

The invention thus solves the problem of providing a plurality of scales corresponding to a plurality of inductances without at the same time limiting the number of frequency sub-ranges that can be practically employed, thus increasing the total effective range of the instrument, as well as making possible the use of very narrow sub-ranges which provides highly accurate frequency readings.

More specifically, the instrument of the invention utilizes a set of interchangeable frequency-determining coils, each having its own attached scale corresponding to the frequency sub-range covered by such coil. The so provided coil-scale element is designed to be plugged or otherwise electrically incorporated into the oscillating circuit of the instrument. The scale then cooperates with a rotatable transparent tuning disk having indicia thereon, or other suitable tuning and indicating means, to provide a frequency reading. Since there is no multiple scale crowding problem, there is no limit to the number of frequency sub-ranges employable.

For the purpose of more fully explaining objects and features of the invention, a preferred embodiment thereof is described in the following detailed description and shown in the accompanying drawings, in which:

FIG. 1 is a front view of the instrument with a coil-scale element plugged in;
FIG. 2 is a side view of the instrument with a coil-scale element plugged in, partially cut away to show the tuning element inside the main housing;
FIG. 3 is an underneath view of the coil-scale element;
FIG. 4 is a front and top view of the coil-scale element; and
FIG. 5 is a top view of the instrument, showing the position of the coil socket with the coil-scale element unplugged.

Referring to the drawings, the grid dip meter of the invention therein shown includes a somewhat elongated housing 11, having a front panel or wall 12, an upper end wall 13, a lower end wall 14, and a curved wall 15 providing a side and rear enclosure. The housing contains conventional radio frequency oscillator circuit elements including a variable capacitor 20. The oscillator circuitry is well known in the art and hence need not be described in detail herein. The front panel or wall 12 of the housing 11 has mounted thereon a micro- or milliammeter 21 connected to the internal circuitry for measuring current flow in the circuit. Above meter 21, the control shaft 22 of the variable capacitor 20 extends through and beyond the front wall 12 of the housing 11. Upon the free end of said control shaft, spaced outwardly from the front wall 12 of the housing, is mounted a transparent tuning disk 23 with indicia 24 in the form of a pointer thereon. The diameter of the disk 23 is preferably somewhat greater than the width of the front wall 12 of the housing, and thus affords a convenient thumb or finger grip means for rotating the control shaft 22. The upper end wall 12 has mounted thereon a coil socket 25 for receiving the prongs 30 of a frequency determining coil 31.

The coil-scale element according to the present invention consists of an induction coil 31 mounted upon a base 32. The base 32 has two flat portions 33 and 34 meeting at approximately a right angle so that when the coil mounting portion 33 thereof is in operative position parallel to the upper end wall 13 of the housing, the scale carrying portion 34 thereof lies parallel to front wall 12. The coil mounting portion 33 carries the generally cylindrical coil 31 with its axis perpendicular to said portion 33, and has prongs 30 extending from the coil parallel to its axis through and beyond the base portion 33 and perpendicular thereto. These prongs 30 are arranged to plug into coil socket 25 contained in upper end wall 13 of the housing, as best illustrated in FIGS. 2 and 5, and they perform the dual function of mechanically securing the coil-scale element to the housing, and electrically incorporating the coil into the internal oscillating circuitry. The scale carrying portion 34 of the base 32 bears on its outer surface a frequency scale 35 corresponding to the range of frequencies in which the given coil enables the instrument to operate. A cut out section 36 accommodates the control shaft 22.

With the coil-scale element plugged into the coil socket in the upper end wall of the housing, the scale carrying portion of the base lies between the inner face of the tuning disk 23 and the front wall 12 of the housing, spaced as close to the disk as possible without interfering with its rotation. The close spacing aids the cooperation between the scale and the indicia 24 on the disk by decreasing parallex. By using a transparent disk having pointer indicia 24 thereon, and arranging the scale so that it is partially overlapped by the disk, ease and accuracy in reading are facilitated.

Although in the present embodiment the scale lies behind the tuning disk, it is obvious that, with small changes, their relative positions could be reversed. It is also obvious that other grasping and shaft position indicating means than a transparent disk with indicia could be used, as, for example, a pointer and knob. Various other modifications within the spirit of the invention and the scope of the appended claims will be apparent to those skilled in the art.

What is claimed is:

1. In an instrument of the type described, a main housing containing an internal tunable element with a control shaft extending through a wall in the housing, a socket on an adjacent wall of the housing, and a shaft position indicator mounted on the external portion of the control shaft and spaced from the wall of the housing; in combination with a set of interchangeable coil-scale elements, each such element consisting of an induction element and a base, said base having two flat portions approximately perpendicular to each other, the first portion carrying the induction element, with prongs extending through the base and spaced to plug into the socket, the second portion extending into a position of partial overlap with the shaft position indicator, and bearing a scale corresponding to the range of frequencies in which the induction element enables the instrument to operate.

2. In a grid dip meter, the combination of a housing; a tunable element with a control shaft extending through a wall in the housing; a coil socket on an adjacent wall of the housing; a transparent tuning disk with indicia thereon mounted on the external portion of the control shaft and spaced outwardly from the wall of the housing; and a set of interchangeable coil-scale elements each containing a coil and a base, said base having two flat portions approximately perpendicular to each other; the first portion carrying the coil and having prongs extending through the base spaced to plug into the coil socket; the second portion extending into a position of partial overlap with the tuning disk and bearing a scale corresponding to the range of frequencies in which the coil enables the meter to operate.

References Cited by the Examiner

Dezetell, L.: The Grid-Dip Meter in Electronics World, December 1960, pp. 50–51.

General Radio Company Catalog F, part 3, October 1931, pp. 189–190.

WALTER L. CARLSON, *Primary Examiner.*

G. L. LETT, E. F. KARLSEN, *Assistant Examiners.*